US009510562B2

(12) United States Patent
Pio

(10) Patent No.: US 9,510,562 B2
(45) Date of Patent: Dec. 6, 2016

(54) FEEDING NIPPLE

(71) Applicant: Chris's Squirrels and More, LLC, Somers, CT (US)

(72) Inventor: Christina A. Pio, Somers, CT (US)

(*) Notice: Subject to any disclaimer, the term of this patent is extended or adjusted under 35 U.S.C. 154(b) by 35 days.

(21) Appl. No.: 13/938,321

(22) Filed: Jul. 10, 2013

(65) Prior Publication Data
US 2015/0013613 A1    Jan. 15, 2015

(51) Int. Cl.
*A01K 9/00* (2006.01)
(52) U.S. Cl.
CPC .................... *A01K 9/005* (2013.01)
(58) Field of Classification Search
CPC ................. A01K 9/00; A01K 9/005
USPC .......... 119/51.01, 71, 72; 222/630, 631, 634
IPC ....................................... A01K 9/00
See application file for complete search history.

(56) References Cited

U.S. PATENT DOCUMENTS

| 97,659 | A | | 12/1869 | Lockwood | |
|---|---|---|---|---|---|
| 1,127,797 | A | | 2/1915 | Moore | |
| 2,773,475 | A | * | 12/1956 | Zottoli | 119/71 |
| 3,082,770 | A | * | 3/1963 | Straub | A61J 11/005 215/11.1 |
| 3,698,952 | A | | 10/1972 | Rose-Miller | |
| 4,752,291 | A | | 6/1988 | Magrath | |
| 5,300,089 | A | | 4/1994 | Sassin | |
| 5,554,116 | A | * | 9/1996 | Fu-Hsiang | 604/77 |
| 5,638,769 | A | | 6/1997 | McIntyre et al. | |
| 5,653,732 | A | | 8/1997 | Sheehy | |
| 5,769,285 | A | * | 6/1998 | Upham et al. | 222/481.5 |
| 5,784,999 | A | | 7/1998 | Larson et al. | |
| 5,797,505 | A | | 8/1998 | Kaura | |
| 7,712,617 | B2 | | 5/2010 | Silver | |
| D617,057 | S | | 6/2010 | Terwilleger | |
| D617,508 | S | | 6/2010 | Terwilleger | |
| 7,828,821 | B2 | | 11/2010 | Renz | |
| 8,056,508 | B1 | | 11/2011 | Bryan et al. | |

(Continued)

FOREIGN PATENT DOCUMENTS

| CN | 2004803896 | 2/2004 |
|---|---|---|
| EP | 0295143 | 12/1988 |

(Continued)

OTHER PUBLICATIONS

English-language translation of CN 1747795 A.*

*Primary Examiner* — Lisa Tsang
(74) *Attorney, Agent, or Firm* — Doherty, Wallace, Pillsbury & Murphy, P.C.

(57) ABSTRACT

A feeding nipple comprising a dome-shaped crown having a convex-shaped outer surface and a lower region which is concentrically formed with the convex-shaped outer surface and which extends therefrom to form a shelf, wherein the crown provides a surface whereby an animal may knead on the feeding nipple while the animal is feeding from the nipple. The crown comprises a diameter sufficiently sized so as to prevent the nipple from being inhaled by the animal. The feeding nipple further comprises a collar which is contiguously formed with the lower region and which is recessed relative thereto. A mount is contiguously and concentrically formed with the collar and comprises a diameter that assists in securing the feeding nipple to a fluid source. A transverse interior wall is transversely positioned within an opening centrally formed through lower region, wherein transverse interior wall assists in securing the feeding nipple to a fluid source.

4 Claims, 9 Drawing Sheets

(56) References Cited

U.S. PATENT DOCUMENTS

| | | |
|---|---|---|
| 8,117,990 B2 | 2/2012 | Terwilleger |
| 2007/0131637 A1* | 6/2007 | Tamura et al. .............. 215/11.1 |
| 2007/0137581 A1 | 6/2007 | Watanabe |
| 2009/0194030 A1* | 8/2009 | Liang .............................. 119/71 |

FOREIGN PATENT DOCUMENTS

| | | | |
|---|---|---|---|
| EP | 0612511 | 8/1994 | |
| EP | 1779833 | 5/2007 | |
| EP | 1554929 | 7/2011 | |
| GB | 936992 * | 9/1963 | |
| JP | 2001299877 | 4/2000 | |
| WO | WO 9956532 A1 * | 11/1999 | .............. A01K 7/06 |
| WO | 0119319 | 3/2001 | |

* cited by examiner ated with the convex-shaped outer surface and which extends therefrom to form a shelf, wherein the crown provides a surface whereby an animal may knead on the feeding nipple while the animal is feeding from the nipple. Additionally, the crown comprises a diameter sufficiently sized so as to prevent the nipple from being inhaled by the animal.

FEEDING NIPPLE

BACKGROUND TO THE INVENTION

1. Field of the Invention

The present invention relates in general to a feeding nipple, and, more particularly, to a feeding nipple specially formed for mammals, and more particularly to mammals sized up to about 30 pounds.

2. Background of the Invention

Although feeding nipples for use in the feeding of animals, and more particularly, mammals, wild animals having a relatively small size, e.g., up to about 30 pounds, wherein such mammals may include, e.g., mice, squirrels, rats, rabbits, bats, opossums, small sized dogs and cats, and the like, are known, such feeding nipples are largely inadequate as they do not allow the animal to mimic its natural feeding motion and habits. Additionally, such traditionally used feeding nipples are flawed in that they often cause the animal to inhale the fluid and aspirate, or to inhale the nipple and choke.

Another problem with nipples found in the prior art is that they are not manufactured with a pre-formed hole at the tip of the nipple through which the fluid exits the nipple and enters the animal's mouth as the animal suckles from the nipple. Accordingly, prior to use, a hole is typically manually formed through a tip of the nipple, such as, for example, through the use of a pin, a knife, and the like. Oftentimes, the hole is formed too large or too small such that the animal aspirates upon feeding.

Another problem with nipples of the prior art is that they are not adaptable to a variety of fluid sources. That is, nipples of the prior art are typically manufactured to be secured to a particular bottle that oftentimes is sold in tandem with the particular nipple. Accordingly, it is difficult if not impossible, to adapt a particular nipple to a number of types and/or brands of fluid sources.

A further problem with prior art nipples is the fact that they are typically constructed from dense, synthetic rubber materials and/or are uncomfortably thick such that the nipple is not sufficiently pliable and/or flexible, which thereby, makes it difficult and/or uncomfortable for the animal to suck from the nipple.

Accordingly, what is needed is a feeding nipple which is specially configured to allow an animal, and more especially a mammal having a weight of up to about 30 pounds, to feed in a manner that is both comfortable and instinctually natural for the animal and which greatly reduces the risks of choking and aspiration. What is further needed is a feeding nipple that can be used on a variety of types and sizes of fluid sources.

SUMMARY OF THE INVENTION

In view of the forgoing disadvantages inherent in prior art nipples, the present invention provides a feeding nipple comprising a dome-shaped crown having a convex-shaped outer surface and a lower region which is concentrically formed with the convex-shaped outer surface and which extends therefrom to form a shelf, wherein the crown provides a surface whereby an animal may knead on the feeding nipple while the animal is feeding from the nipple. Additionally, the crown comprises a diameter sufficiently sized so as to prevent the nipple from being inhaled by the animal.

The feeding nipple further comprises a tip which is specially configured to provide fluid to the animal in an amount and in a manner that provides comfort and safety to the animal.

The feeding nipple further comprises a collar which is contiguously formed with the lower region and which is recessed relative thereto. A mount is contiguously and concentrically formed with the collar and comprises a diameter that assists in securing the feeding nipple to a bottle. A transverse interior wall is transversely disposed within an opening centrally formed through lower region, wherein transverse interior wall assists in securing the feeding nipple to a syringe.

A primary object of the present invention is to provide a feeding nipple for an animal, particularly for relatively small mammals, e.g., mammals having a size of up to about 30 pounds, including, e.g., mice, squirrels, rats, rabbits, opossums, bats, voles, moles, small-sized dogs and cats, and the like, that will overcome the shortcomings of prior art nipples.

Another object is to provide a feeding nipple that is configured to allow the animal to mimic its natural feeding behavior when suckling from the feeding nipple.

An additional object is to provide a feeding nipple that is configured to prevent the animal from aspirating on the fluid suckled from the feeding nipple, and to also prevent the animal from choking on the feeding nipple.

A further object is to provide a feeding nipple that has a pre-formed hole provided through a tip thereof, wherein the hole provides an outlet for the fluid as the animal suckles from the feeding nipple and which is configured to prevent the animal from aspirating.

Another object is to provide a feeding nipple having a sufficient size so as to prevent the animal from inhaling and choking on the feeding nipple whilst the animal is suckling therefrom.

A further object is to provide a feeding nipple which enhances the animal's comfort during the feeding process.

Another object is to provide a feeding nipple that allows the animal to form a suction between the feeding nipple and the animal's lips so as to promote efficient feeding while minimizing the risk of aspiration.

Another object is to provide a feeding nipple that is adaptable to a variety of shaped and types of fluid sources, wherein such sources, include, e.g., bottles, syringes, and the like.

A further object is to provide a feeding nipple that is simple and easy to use.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

For a better understanding of these and other objects of the present invention, reference will be made to the detailed description of the present invention which is to be read in association with the accompanying drawings, wherein.

DETAILED DESCRIPTION OF THE INVENTION

Figure 1:
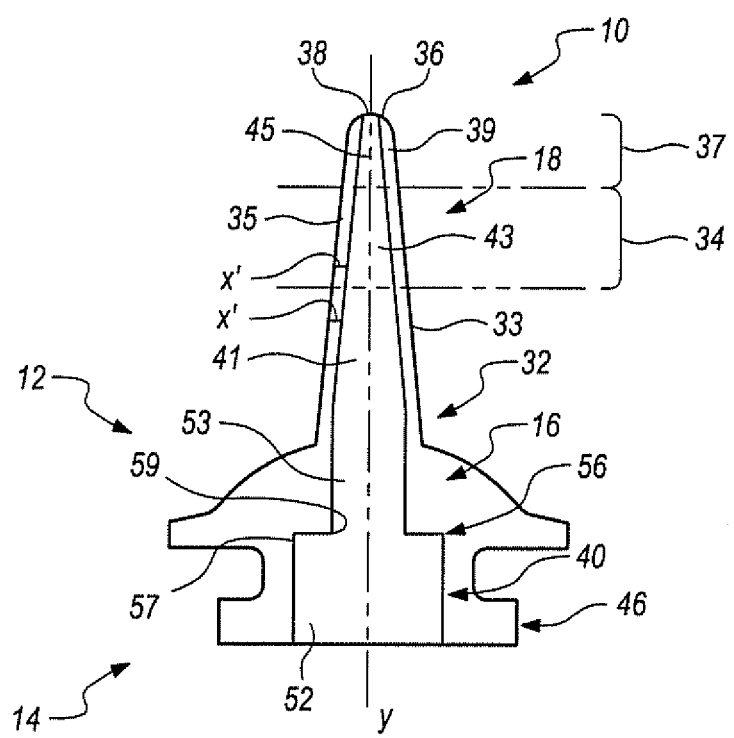
FIG. 1 is a schematic depicting a cross-sectional view of an exemplary feeding nipple.
Figure 2:
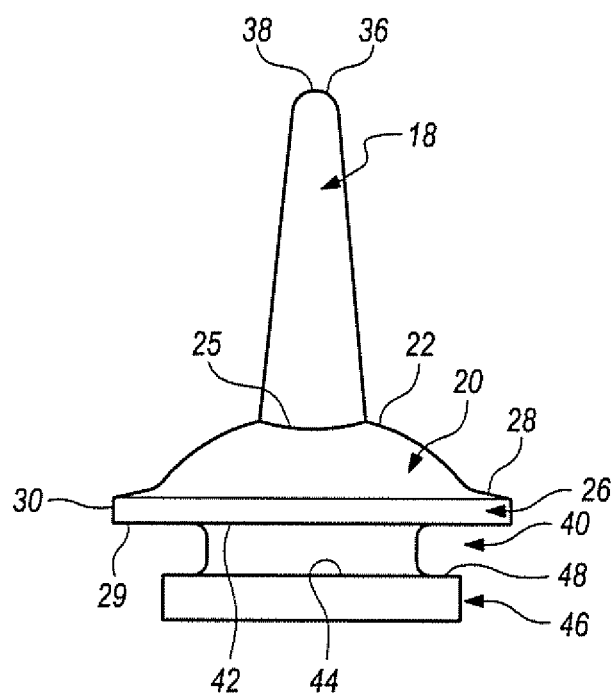
FIG. 2 is a schematic depicting a side view of the feeding nipple depicted in FIG. 1.
Figure 3:
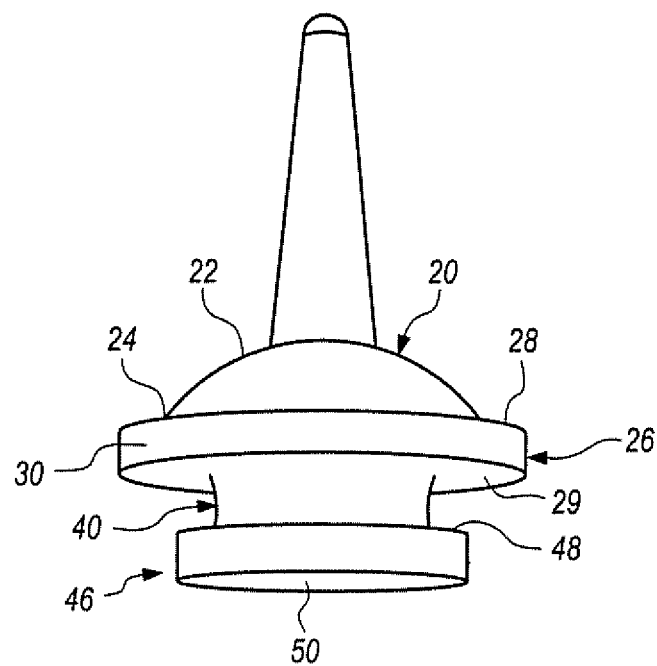
FIG. 3 is a schematic depicting an elevational view of a top side of the feeding nipple depicted in FIG. 1.
Figure 4:
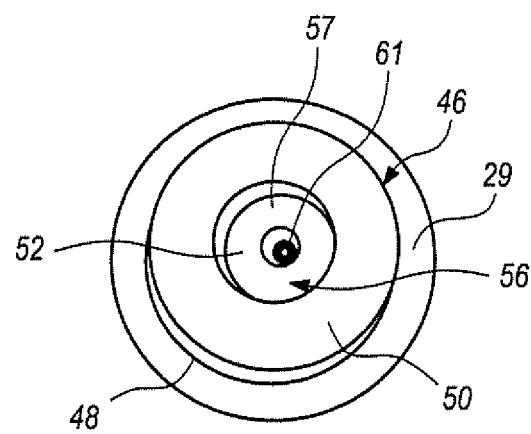
FIG. 4 is a schematic depicting an elevational view of a bottom side of the feeding nipple depicted in FIG. 1.

The feeding nipple of the present disclosure is for use in combination with a fluid source. The feeding nipple is specially designed to allow an animal feeding from the nipple to replicate the animal's suckling and kneading instincts. The feeding nipple comprises a mouthpiece configured to allow the animal to knead the mouthpiece with the animal's forepaws when the animal is feeding from the nipple. In an exemplary embodiment, the mouthpiece comprises an upper region having a uniformly formed and substantially convex shaped body defined at an uppermost end thereof by an apex, and by a base at an oppositely situated lowermost end of the body of the upper region. The mouthpiece further comprises a lower region having a uniformly formed and generally annular-shaped body, wherein the annular-shaped body is concentrically and contiguously formed with the base of the upper region, and wherein the upper region is recessed relative to the lower region. The mouthpiece further comprises a tip which is contiguously and concentrically formed with the apex of the upper region and which extends longitudinally therefrom to terminate at an apex surface which is positioned opposite to the lower region.

The feeding nipple further comprises a securing structure. The securing structure comprises a collar and a mount. In an exemplary embodiment, the collar has a generally cylindrical shaped body which is concentrically and contiguously formed with the generally annular-shaped body of the lower region opposite to the upper region.

In an exemplary embodiment, the mount comprises a generally cylindrical shaped body, which is concentrically and contiguously formed with the body of the collar opposite to the mouthpiece. The body of the mount has an outer diameter greater than an outer diameter of the body of the collar and less than an outer diameter of the body of the lower region of the mouthpiece.

In an exemplary embodiment, the feeding nipple further comprises a uniformly formed cylindrically-shaped first chamber centrally formed through and continuously extending from the apex of the upper region of the mouthpiece and to and through the lower region of the mouthpiece. The feeding nipple also comprises a second chamber centrally formed through the tip of the mouthpiece, and which continuously extends from the apex of the upper region to the apex surface of the tip, wherein the first and second chambers are continuously formed with one another.

The feeding nipple further comprises a uniformly formed third cylindrically-shaped chamber centrally formed through the body of the collar and the body of the mount, wherein the third chamber is continuously formed with the second chamber.

The invention shall now be described with reference to the drawings, in which similar reference characters denote similar elements throughout the several views. Referring to FIGS. 1-4, a feeding nipple 10 for use in combination with a fluid source, such as, e.g., a bottle 100, a syringe 200, and a syringe 300 is shown. Feeding nipple 10 comprises a mouthpiece 12 and a securing structure 14. Mouthpiece 12 is specially configured to allow an animal, especially a mammal, and even more especially a mammal of relatively small size, i.e., of up to about 30 pounds, wherein such animals include, e.g., mice, squirrels, rabbits, bats, rats, opossums, voles, moles, small-sized dogs and cats, and the like, and even more especially a relatively small-sized mammal up to about 8 to about 9 weeks old, to mimic its natural feeding behavior while eliminating or greatly reducing the animal's chance of inhaling and choking on feeding nipple 10 and/or of aspirating from feeding from feeding nipple 10. More particularly, mouthpiece 12 is configured such that the animal can comfortably suckle mouthpiece 12 while kneading mouthpiece 12 with its front paws without the attendant high possibility of aspiration and/or choking. Securing structure 14 allows feeding nipple 10 to be attached in a waterproof sealed manner to a variety of fluid sources.

Mouthpiece 12 and securing structure 14 are integral and fabricated out of a natural rubber material, such as, e.g., gum rubber, and preferably comprises a hardness of about 45 durometers. Such a material confers a suitable amount of flexibility to the feeding nipple, thereby enhancing the comfort of the mouthpiece in the animal's mouth.

Mouthpiece 12 includes a dome-shaped crown 16 integrally formed with securing structure 14, and a centrally formed tip 18 which extends longitudinally from dome-shaped crown 16 in a direction opposite to securing structure 14.

Dome-shaped crown 16 includes an upper region 20 having a substantially convex outer surface, wherein an apex 22 of the curved outer surface of upper region 20 is directed o towards tip 18 and a base 24 of the curved outer surface of upper region 20 is directed towards securing structure 14.

Dome-shaped crown 16 further comprises a lower region 26. Lower region 26 is contiguously and concentrically formed with base 24 and extends outwardly therefrom to form a substantially planar shelf 28. Shelf 28 turns downwardly towards securing structure 14 to form a side wall 30, which then turns inwardly towards apex 22 to form a bottom side 29. Lower region 26 comprises a diameter of sufficient length to thereby prevent the animal from inhaling feeding nipple 10 as the animal feeds therefrom.

Tip 18 of feeding nipple 10 is specially configured to allow optimal feeding by the animal as it allows the animal to form a suction between the animal's lips and tip 18. Additionally, tip 18 is further configured to accommodate the various mouth sizes of the animals that may suckle on tip 18 of mouthpiece 12.

To that end, tip 18 comprises a lower segment 32 having a bottom side 25 that is contiguous with and concentric with apex 22 of upper region 22. Contiguously formed with and extending from bottom side 25 is a substantially cylindrical-shaped side wall 33. Side wall 33 extends longitudinally from bottom side 25 in a direction opposite to securing structure 14. A generally cylindrical-shaped chamber 41 is centrally formed through side wall 33 along a longitudinal axis Y of feeding nipple 10. Tip 18 further comprises an intermediate segment 34 having a generally conical-shaped side wall 35 which is contiguous with side wall 33 of lower segment 32 and which extends upwardly and slopes inwardly therefrom. A generally conical-shaped chamber 43, which is coaxial and continuously formed with chamber 41, is centrally formed through side wall 35 of intermediate segment 34. An upper segment 37 of tip 18 has a generally conical-shaped side wall 39 which is contiguous with side wall 35 of intermediate segment 34 and which extends upwardly and slopes inwardly therefrom at a slope that is greater than the slope of side wall 35. A generally conical-shaped chamber 45, which is coaxial and continuously formed with chamber 43, is centrally formed through side wall 39 of upper segment 37. Side wall 39 of upper segment 37 extends continuously to meet an apex surface 36, wherein apex surface 36 has a hole 38 formed therethrough, wherein hole 38 is centrally formed and coaxial with chamber 45. Hole 38 is formed through apex surface 36 and is dimensioned to allow the fluid contained within a fluid source to safely exit therefrom when the animal suckles. In addition to the geometrical configuration as described above, in an exemplary embodiment, side wall 33 of lower segment 32 comprises a thickness X' of up to about 1.5 times greater than a thickness X' of side wall 35 of intermediate segment 34, wherein a thickness of about 1.4 times greater is preferred, thereby making side wall 35 less rigid than side wall 33.

Securing structure 14 includes an annular recessed collar 40 concentrically formed with an annular mount 46. Collar 40 has a top side 42 oppositely situated to a bottom side 44, wherein top side 42 is contiguously formed with and extends below bottom side 29 of lower region 26. Mount 46 has a top side 48 oppositely situated to a bottom side 50, wherein top side 48 is contiguously formed with bottom side 44 of collar 40.

Upper region 20, lower region 26, collar 40, and mount 46 are concentrically formed with one another, wherein lower region 26 has the largest outer diameter. In an exemplary embodiment, lower region 26 has an outer diameter of up to about 1.5 times greater than that of mount 46, and an outer diameter of up to about 2.0 times greater than that of collar 40.

Feeding nipple 10 further comprises a lower interior chamber 52 continuously formed with an upper interior chamber 53. Lower interior chamber 52 is centrally formed through mount 46 along longitudinal axis Y of feeding nipple 10, and, which, hence, is coaxial with chambers 41, 43, and 45 of tip 18. Lower interior chamber 52 has a generally cylindrical configuration, and continuously extends from bottom side 50 of annular mount 46 to outer edges 57 of a transverse interior wall 56. Transverse interior wall 56 has a generally ring-shaped configuration and is positioned at an approximately transverse midsection X of lower region 26. Transverse interior wall 56 has an opening 61 centrally formed through outer edges 57 and oppositely situated inner edges 59. Upper interior chamber 53 is centrally formed through mouthpiece 12 and extends from top side 59 of transverse interior wall 56 to apex 22 of upper region 20. Upper interior chamber 53 is continuously formed with. chamber 41 of tip 18.

In an exemplary embodiment, chamber 41 and opening 61 comprise substantially equal diameters, and lower interior chamber 52 comprises a diameter up to about 2.5 times greater than that of chamber 41 and opening 61, wherein a diameter of up to about 2.30 times greater is especially preferred.

Figure 5:
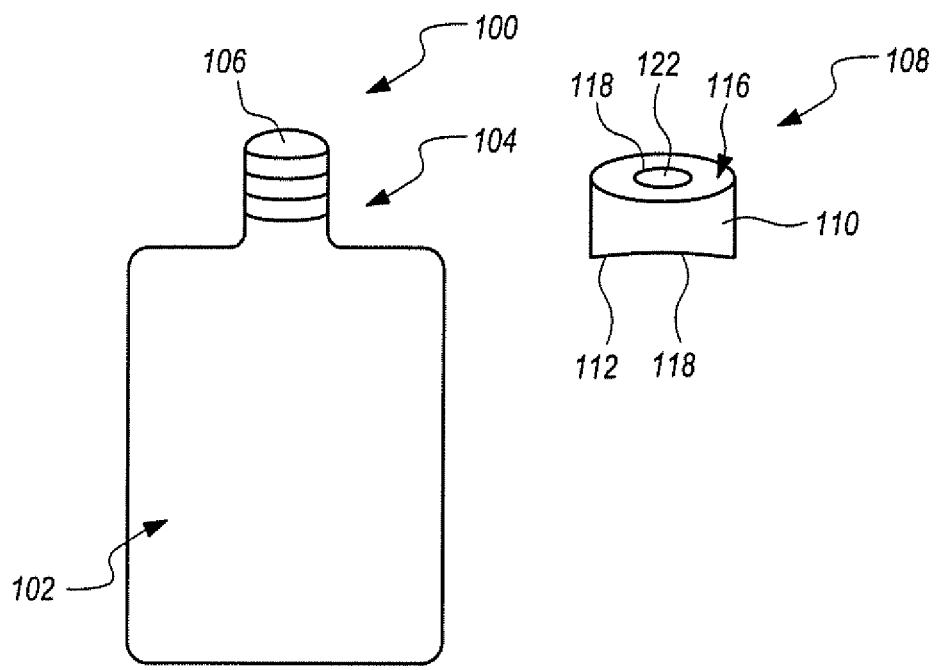
FIGS. 5 and 6 are schematics depicting an exemplary fluid source.
Figure 6:
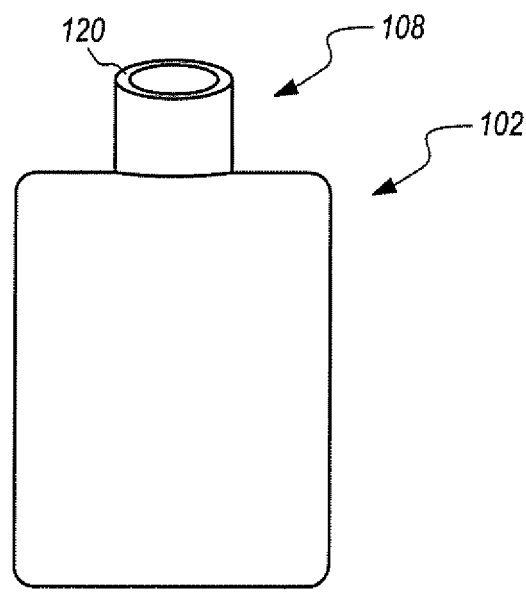
Figure 7:
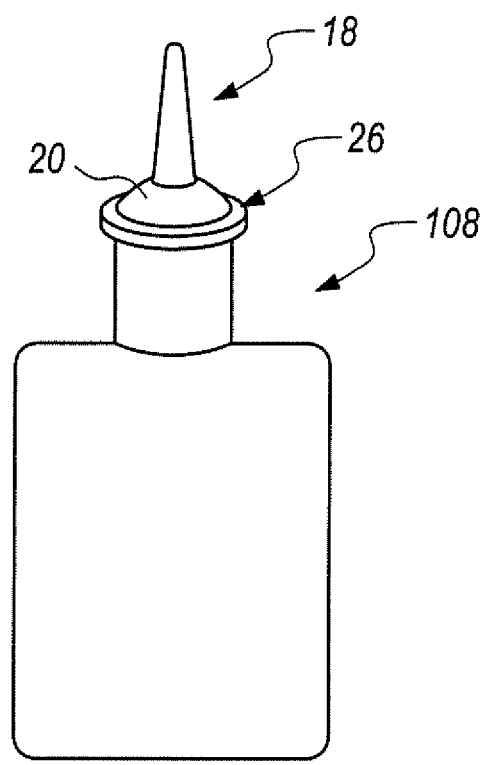
FIG. 7 is a schematic depicting the feeding nipple shown in FIGS. 1-4 disposed on the fluid source depicted in FIGS. 5 and 6.
Figure 8:
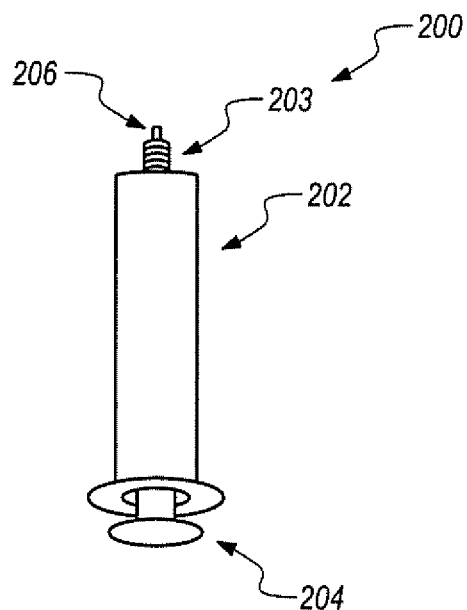
FIG. 8 is a schematic depicting another exemplary fluid source.
Figure 10:
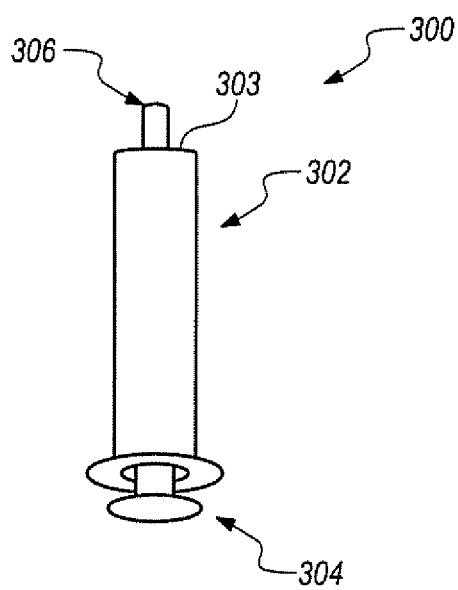
FIG. 10 is a schematic depicting another exemplary fluid source.

As previously stated, feeding nipple 10 is specially configured to fit a variety of fluid sources. As shown in FIGS. 5 and 6, an exemplary fluid source comprises a bottle 100. Bottle 100 comprises a tubular shaped body 102 which is contiguously formed with a threaded neck 104 having a central aperture 106 formed therethrough. Bottle 100 further comprises a cap 108. Cap 108 comprises an annular side wall 110 having a threaded interior side 112 that surrounds a centrally formed opening 118. A rim 116 tops off side wall 110 and extends perpendicularly inwardly therefrom, wherein rim 116 has an interior side 118 oppositely situated to an exterior side 120. An opening 122 is centrally formed through rim 116 and is continuously formed with opening 118.

Feeding nipple 10 may be secured to bottle 10 by positioning annular mount 46 through opening 122 of cap 108 such that mount 46 extends into opening 118 and tip 18 is directed opposite to interior side 118. Cap 108 may then be positioned over and engaged with threaded neck 104 of bottle 100 such that threaded interior side 112 of cap 108 is engaged with threaded neck 104 and such that annular recessed collar 40 extends above rim 116 of cap 108. Once so engaged, top side 48 of annular mount 46 physically abuts interior side 118 of rim 116 and forms a seal therewith.

Another exemplary fluid source comprises syringe 200. Syringe 200 comprises a barrel 202 and a piston 204, wherein piston 204 is disposed within barrel 202 by conventionally known means. Barrel 202 terminates at a collar 203. A tip 206 comprising a Luer lock configuration, as is conventionally known, extends from collar 203.

Figure 9:
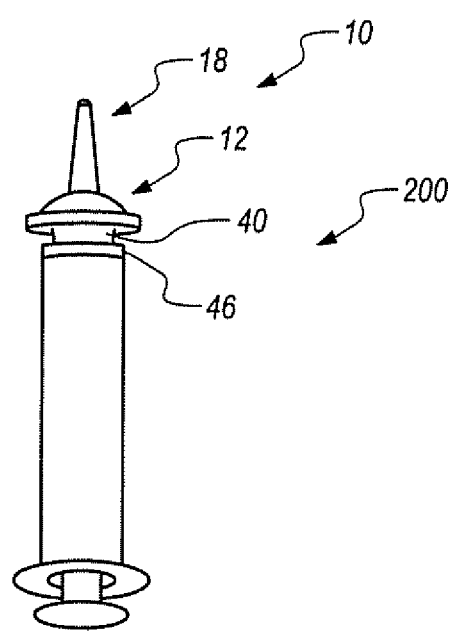
FIG. 9 is a schematic depicting the feeding nipple shown in FIGS. 1-4 disposed on the fluid source depicted in FIG. 8.

Referring to FIG. 9, feeding nipple 10 may be connected to syringe 200 by positioning tip 206 within lower interior chamber 52 such that tip 206 extends through opening 61 and into chamber 41 until collar 203 of barrel 202 physically abuts transverse interior wall 56. Lower interior chamber 52 comprises a diameter sufficiently sized so that mount 46 holds feeding nipple thereto by a frictional fit. Upon suckling, the animal's oral movement creates a seal between feeding nipple 10 and syringe 200.

Figure 11:
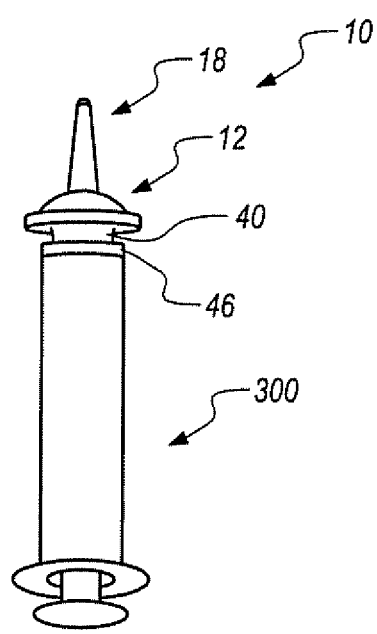
FIG. 11 is a schematic depicting the feeding nipple shown in FIGS. 1-4 disposed on the fluid source depicted in FIG. 10.

Another exemplary fluid source comprises a syringe 300. Syringe 300 comprises a barrel 302 and a piston 304, wherein piston 304 is disposed therein by conventionally known means. Barrel 302 terminates at a top side 303. A tip 306 comprising a slip tip configuration, as is conventionally known, extends from top side 303. Referring to FIG. 11, feeding nipple 10 may be connected to syringe 300 by positioning tip 306 within lower interior chamber 52 and pushing feeding nipple 10 over tip 306 such that tip 306 extends through opening 61 and into chamber 41 until collar 303 of barrel 302 physically abuts transverse interior wall 56 and is held thereto by a frictional fit formed between transverse interior wall 56 and tip 306. Upon suckling, the animal's oral movement creates a seal between feeding nipple 10 and syringe 300.

Figure 12:
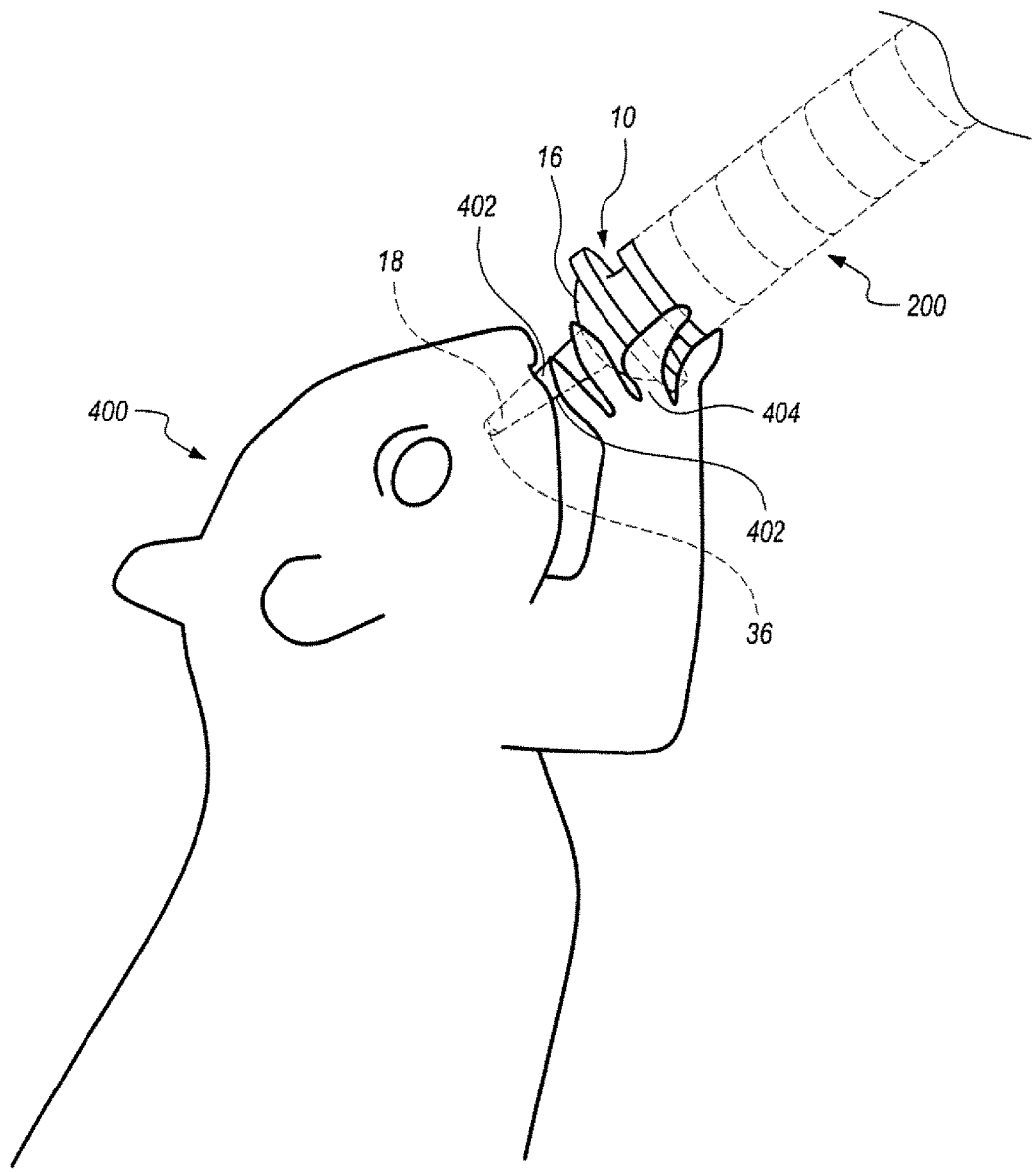
FIG. 12 is a schematic depicting an exemplary animal feeding from the feeding nipple depicted in FIGS. 1-4.

An exemplary use of feeding nipple 10 is depicted in FIG. 12. As shown in FIG. 12, a squirrel 400 feeds from feeding nipple 10 by inserting tip 18 into its mouth such that lips 402 of squirrel 400 form a suction along a length of tip 18. Due to the variations in flexibility along a length of tip 18, tip 18 will have varying degrees of bend while squirrel 400 is suckling from tip 18. While feeding, squirrel 400 may knead upon feeding nipple 10 by placing its front paws 404 on dome-shaped crown 16 and moving front paws 404 in a back and forth kneading motion, wherein this motion mimics the motion the animal uses when feeding from its natural mother.

Although the feeding nipple may be sized to meet the specific needs of a particular animal, the feeding nipple is especially formed to meet the feeding needs of a small-sized mammal, wherein preferred mammals include, for example, mice, squirrels, bats, rabbits, opossums, rats, voles, moles, small-sized dogs and cats, and the like. Furthermore, not only is the feeding nipple configured to ensure that the animal receives proper nutrition through a primarily fluid source, it also ensures that the animal does not aspirate the primarily fluid source and/or choke on the feeding nipple. Also, the tip of the dome-shaped crown of the feeding nipple is sized and tapered to maximize the animal's ability to comfortably feed and to create a suction between the animal's lips and the nipple's tip. Furthermore, the upper region of the dome-shaped crown is especially sized and dimensioned to allow the animal to knead the upper region with its front paws whilst it feeds, thereby, allowing the animal to mimic its natural feeding behavior.

To that end, in an exemplary embodiment, and without limiting the invention thereby, feeding nipple 10 may have dimensions as immediately set forth herein below. Feeding nipple 10 may comprise a height of about 1.25 inches. Annular mount 46 may comprise an outer diameter of about 0.625 inch and a height of about 0.093 inch. Annular recessed collar 40 may comprise an outer diameter of about 0.45 inch and may have a height of about 0.115 inch. Lower region 26 may comprise an outer diameter of about 0.875 inch, and may have a height of about 0.063 inch. Upper region 20 may comprise a height of about 0.202 inch. Tip 18 may comprise a height of about 0.768 inch. Lower interior chamber 52 may comprise a diameter of about 0.309 inch, and a height of about 0.25 inch. Chamber 41 may comprise a diameter of about 0.135 inch, and a height of about 0.469 inch. Each of chambers 43 and 45 may have a height of about 0.25 inch. Chamber 45 may have as its smallest diameter at the point where it meets hole 38, of about 0.0547 inch. Hole 38 may have a diameter of about 0.028 inch.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A feeding nipple comprising:
    a mouthpiece configured to allow an animal having forepaws and lips to knead the mouthpiece with the animal's forepaws when the animal is feeding from the feeding nipple and which is further configured to create a suction between the animal's lips and the mouthpiece that minimizes a risk of aspirating when the animal is feeding from the feeding nipple, wherein the mouthpiece comprises:
        a uniformly formed and substantially convex shaped body defined at an uppermost end thereof by a centrally formed apex, and by a base at an oppositely situated lowermost end thereof;
        a lower region having a uniformly formed and generally annular shaped body, wherein the generally annular shaped body is defined at an uppermost end by a planar shelf and at an oppositely situated lowermost end by a bottom side, wherein the base of the substantially convex shaped body is contiguous with, and centrally positioned relative to, the shelf such that the shelf extends outwardly from the base; and
        a tip which is contiguous with and concentric to the apex of the substantially convex shaped body and which extends longitudinally therefrom in a direction opposite to the bottom side of the lower region; and
    a securing structure designed to physically engage with a fluid source, wherein the securing structure comprises:
        a collar having a generally cylindrical shaped body, wherein the body of the collar is defined at an uppermost end thereof by a top side and by an oppositely situated lowermost end thereof by a bottom side, wherein the top side of the collar is central to and contiguous with the bottom side of the lower region of the mouthpiece;
        a mount having a generally cylindrical shaped body, wherein the body of the mount is defined at an uppermost end thereof by a top side and by an oppositely situated lowermost end thereof by a bottom side, wherein the top side of the mount is contiguous with, and centrally positioned relative to, the bottom side of the collar; and
        a chamber, wherein the chamber is centrally formed through the bottom side of the mount and through the apex of the substantially convex shaped body, and wherein the chamber continuously extends from the bottom side of the mount to the apex; and
        a transverse interior wall positioned within the chamber and between the bottom side of the collar and the shelf of the mouthpiece, wherein the transverse interior wall has inner edges oppositely positioned from outer edges, wherein the transverse interior wall divides the chamber into a lower interior chamber and an upper interior chamber, wherein the lower interior chamber extends from the bottom side of the mount to the outer edges of the transverse interior wall, and the upper interior chamber extends from the inner edges of the transverse interior wall to the apex of the substantially convex shaped body of the mouthpiece, and wherein the transverse interior wall further comprises an opening formed through the transverse interior wall, and further wherein the opening allows for a fluid communication between the upper and lower interior chambers;
    wherein the fluid source comprises a Luer lock syringe comprising:
        a barrel;
        a collar that extends from a top side of the barrel and comprises a Luer lock configuration; and
        a tip disposed within the collar of the Luer lock syringe and longitudinally extending therefrom in a direction opposite to the barrel;
    wherein the tip of the syringe extends into the lower interior chamber and into the opening of the transverse interior wall, and the collar of the Luer lock syringe is secured to the mount of the feeding nipple via a frictional fit between the collar of the Luer lock syringe and the bodies of the mount and of the collar of the feeding nipple, and further wherein the collar of the Luer lock syringe physically abuts the transverse interior wall.

2. The feeding nipple of claim 1, wherein the lower region of the mouthpiece comprises an outer diameter of about 1.5 times greater than an outer diameter of the body of the mount and wherein the outer diameter of the lower region is about 2.0 times greater than an outer diameter of the body of the collar.

3. A feeding nipple comprising:
   a mouthpiece configured to allow an animal having forepaws and lips to knead the mouthpiece with the animal's forepaws when the animal is feeding from the feeding nipple and which is further configured to create a suction between the animal's lips and the mouthpiece that minimizes a risk of aspirating when the animal is feeding from the feeding nipple, wherein the mouthpiece comprises:
      a uniformly formed and substantially convex shaped body defined at an uppermost end thereof by a centrally formed apex, and by a base at an oppositely situated lowermost end thereof;
      a lower region having a uniformly formed and generally annular shaped body, wherein the generally annular shaped body is defined at an uppermost end by a planar shelf and at an oppositely situated lowermost end by a bottom side, wherein the base of the substantially convex shaped body is continuous with, and centrally positioned relative to, the shelf such that the shelf extends outwardly from the base; and
      a tip which is contiguous with and concentric to the apex of the substantially convex shaped body and which extends longitudinally therefrom in a direction opposite to the bottom side of the lower region; and
   a securing structure designed to physically engage with a fluid source, wherein the securing structure comprises:
      a collar having a generally cylindrical shaped body, wherein the body of the collar is defined at an uppermost end thereof by a top side and by an oppositely situated lowermost end thereof by a bottom side, wherein the top side of the collar is central to and contiguous with the bottom side of the lower region of the mouthpiece;
      a mount having a generally cylindrical shaped body, wherein the body of the mount is defined at an uppermost end thereof by a top side and by an oppositely situated lowermost end thereof by a bottom side, wherein the top side of the mount is contiguous with, and centrally positioned relative to, the bottom side of the collar; and
      a chamber, wherein the chamber is centrally formed through the bottom side of the mount and through the apex of the substantially convex shaped body, and wherein the chamber continuously extends from the bottom side of the mount to the apex; and
      a transverse interior wall positioned within the chamber and between the bottom side of the collar and the shelf of the mouthpiece, wherein the transverse interior wall has inner edges oppositely positioned from outer edges, wherein the transverse interior wall divides the chamber into a lower interior chamber and an upper interior chamber, wherein the lower interior chamber extends from the bottom side of the mount to the outer edges of the transverse interior wall, and the upper interior chamber extends from the inner edges of the transverse interior wall to the apex of the substantially convex shaped body of the mouthpiece, and wherein the transverse interior wall further comprises an opening formed through the transverse interior wall, and further wherein the opening allows for a fluid communication between the upper and lower interior chambers;
   wherein the generally cylindrical shaped body of the collar is recessed relative to the lower region of the mouthpiece and to the generally cylindrical shaped body of the mount, and further wherein the generally cylindrical shaped body of the mount is recessed relative to the lower region of the mouthpiece.

4. The feeding nipple of claim 3, wherein the lower region comprises an outer diameter of about 1.5 times greater than the outer diameter of the body of the mount, and further wherein the outer diameter of the lower region is about 2.0 times greater than an outer diameter of the body of the collar to thereby optimize the animal's ability to knead the lower region when the feeding nipple is attached to one of the variety of fluid sources, to reduce the likelihood that the animal will choke on the feeding nipple, and to optimize the ability of the feeding nipple to attach to a variety of fluid sources.

* * * * *